United States Patent [19]

Davis

[11] Patent Number: 4,958,907
[45] Date of Patent: Sep. 25, 1990

[54] COMPUTER SCREEN MAGNIFIER

[76] Inventor: Dale G. Davis, 8228 Paige, Warren, Mich. 48089

[21] Appl. No.: 297,038

[22] Filed: Jan. 17, 1989

[51] Int. Cl.⁵ ............................................. G02B 7/02
[52] U.S. Cl. .................................. 350/243; 248/298; 248/316.5; 248/918
[58] Field of Search ....................... 350/241, 243, 245; 358/250; 248/316.1, 316.5, 316.7, 298, 918

[56] References Cited

U.S. PATENT DOCUMENTS

| | | | |
|---|---|---|---|
| 2,454,857 | 11/1948 | Bish | 248/316.5 |
| 3,168,276 | 2/1965 | Schneider | 248/316.7 |
| 3,545,805 | 12/1970 | Wilson | 248/316.5 |
| 4,051,535 | 9/1977 | Inglis | 350/243 |
| 4,379,618 | 4/1983 | Tall | 350/239 |
| 4,712,870 | 12/1987 | Robinson et al. | 350/245 |

Primary Examiner—Bruce Y. Arnold
Assistant Examiner—Ronald M. Kachmarik
Attorney, Agent, or Firm—Krass & Young

[57] ABSTRACT

A holder for adjustably positioning a flatsheet magnifier proximate a visual display terminal comprises a mounting for retaining the magnifier and a support for extensibly positioning the mounting in a predetermined, spaced-apart relationship with the terminal. Disclosed are particular arrangements of mounts and supports including slidable members, telescopic legs and pivoting, scissor-action legs, all of which provide for the positioning of a magnifier proximate a display screen.

4 Claims, 2 Drawing Sheets

COMPUTER SCREEN MAGNIFIER

FIELD OF THE INVENTION

This invention relates to holders for magnifying devices, and more particularly to a holder for positioning a flat sheet magnifier in spaced relation to a video display terminal.

BACKGROUND OF THE INVENTION

The discovery of the silicon microchip has led to an exponential growth in the production of affordable computers. Computers are now being used in schools, in large and small businesses and in an ever increasing number of homes. The majority of these computers utilize visual display terminals such as cathode ray tubes which are relatively small in overall dimension.

The display on these terminals is likewise very small and often a very bright color. In order to clearly see and distinguish the characters on the terminal, an operator typically sits very close to the screen. The diminutive characters and their bright, almost fluorescent coloring often leads to extreme eye strain as well as headaches for the operator. Also, the operator may need frequent breaks away from the screen to avoid or relieve eye strain, resulting in reduced productivity. Moreover, recent news articles suggest that there may be a link between the proximity of the operator to the visual display terminal and an increased number of fetal miscarriages among pregnant terminal operators. It will thus be appreciated that there is yet a need for magnifying the characters on a visual display terminal to reduce operator eye strain and to increase the distance between the operator and the terminal. U.S. Pat. No. 4,379,618 issued to Tall discloses a book rest including a flat screen magnifier supported so as to be slidably adjustable in relation to the book page. However, this patent neither teaches nor suggests using the flat screen magnifier on a visual display terminal.

The present invention addresses these problems by providing a holder for positioning a flat screen magnifier on a computer terminal. The holder comprises means for retaining the magnifier and means for supporting and extensibly positioning the magnifier in relation to the terminal. These and other advantages of the present invention will be readily apparent from the drawings, discussion and description and claims which follow.

SUMMARY OF THE INVENTION

There is disclosed herein a holder for adjustably positioning a flat, fresnel-type sheet magnifier proximate a visual display terminal. The holder comprises mounting means for retaining the magnifier and means for supporting and extensibly positioning the mounting means in a predetermined, spaced-apart relationship with the terminal. In one embodiment, the mounting means includes at least two perpendicular members, each defining an interior channel for receiving the magnifier therein. In this embodiment, the supporting means includes at least one support arm secured to the mounting means and a retaining block secured to the visual display terminal. The retaining block defines at least one hole for slidably receiving the support arm therein for extensibly positioning the mounting means.

In an alternative embodiment, the mounting means includes a spring biased clamping device secured to the end of the support arm for holding the magnifier therein. The support arm is slidably received by a retaining block secured to the visual display terminal.

In another embodiment, the means for supporting and extensibly positioning the mounting means includes at least two legs, each leg having telescoping segments contained therein. The mounting means is telescopically positioned over the visual display terminal of a computer such as a lap top computer.

In an alternative embodiment, the mounting means includes at least two diametrically opposing frame members having an interior side and an exterior side, the exterior side having a channel contained therein. The means for supporting and extensibly positioning the mounting means includes at least two base members parallel to the mounting means frame members and having an interior side and an exterior side which defines a second channel. The supporting means further includes at least two legs, each having two ends, pivotally intersect at their centerpoints. The end of the legs are secured in the first and second channels so that pivoting the legs from a first position to a second position extensibly positions the magnifier proximate the visual display terminal.

DETAILED DESCRIPTION OF THE SPECIFIC EMBODIMENTS

Figure 1:
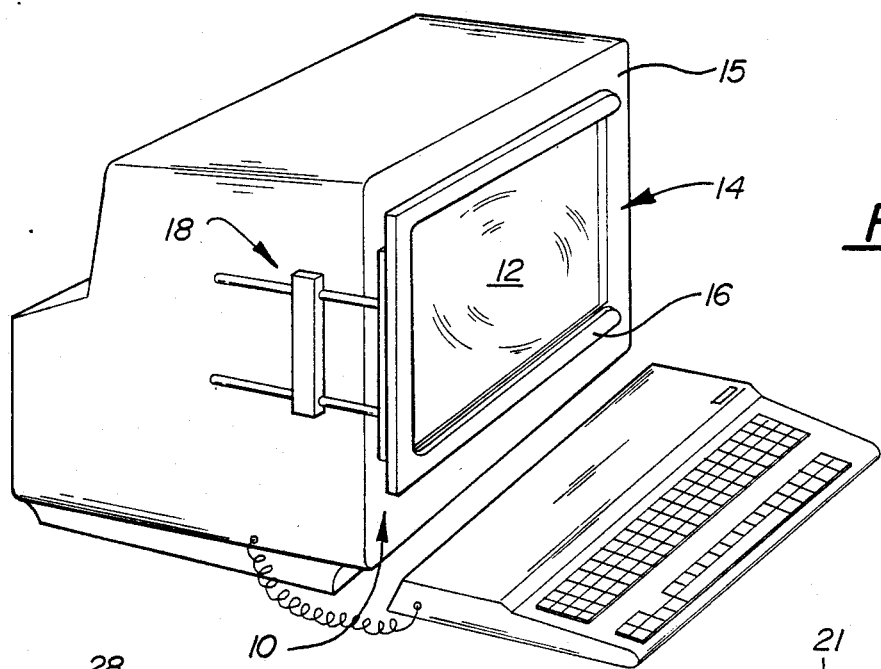
FIG. 1 is a perspective view of a holder for a flat sheet magnifier structured in accord with the principles of the present invention illustrating its mode of use.

Referring now to the drawing, FIG. 1 is a perspective view of a holder 10 for a flat sheet magnifier 12 slidably retained proximate a visual display terminal 14 of a personal computer 15. The magnifier 12 is a flat, fresnel-type magnifier molded of a high optical quality synthetic resin such as polycarbonate, methyl methacylate or similar materials. Other conventional types of flat sheet magnifiers may also be used.

Holder 10 comprises mounting means 16 for retaining the magnifier 12 therein, and means 18 for supporting and extensibly positioning the mounting means 16 in a predetermined, spaced-apart relationship with the terminal 14. Holder 10 may be fabricated from metals, wood, and most preferably from synthetic polymeric materials such as polyethylene, polypropylene, ABS or nylon.

Figure 2A:
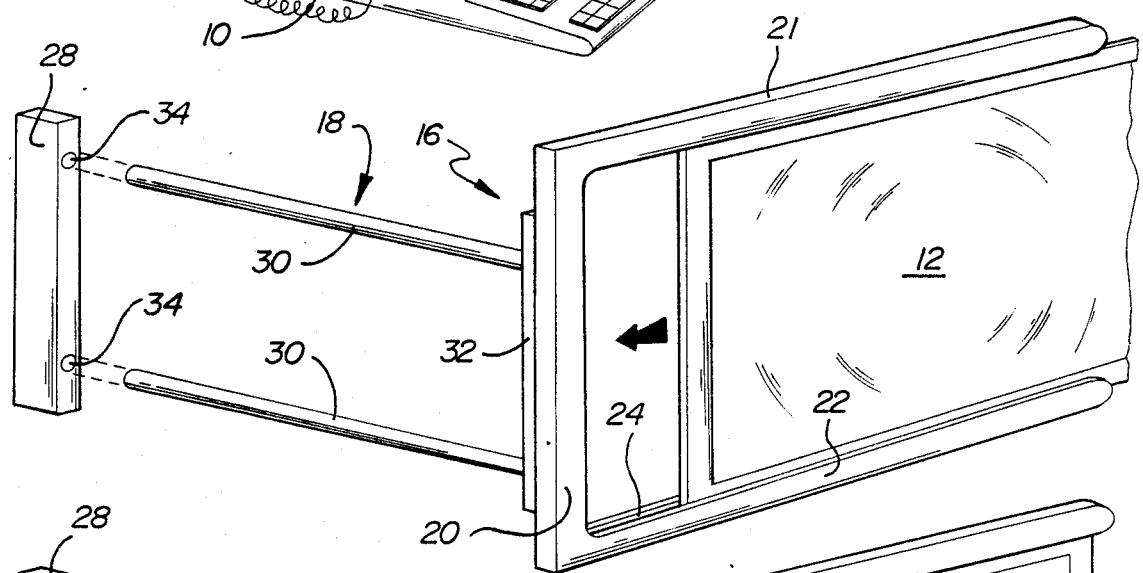
FIG. 2A is an exploded perspective view of the holder of FIG. 1.

Referring now to FIG. 2A, there is shown a perspective view of the holder 10 of FIG. 1. In this embodiment, mounting means 16 comprises three perpendicularly joined members 20, 21, 22. Alternatively, mounting means may be fabricated as a unitary piece having three perpendicular sides for receiving magnifier 12 therein. Each member defines an interior channel 24 for slidably receiving and securing the magnifier 12 therein. In this manner, magnifier 12 can be easily replaced by simply sliding magnifier 12 out of channel 24 and sliding a new magnifier into channel 24. Additionally, the mounting means 16 may be configured to retain other items such as a glare shield or a radiation shield. The mounting means may be so configured by inclusion of a wider channel, or additional channels.

Means 18 for supporting and extensibly positioning the mounting means 16 comprises a retaining block 28 and at least one, but preferably two support arms 30. Retaining block 28 is secured to the visual display terminal using any conventional mode of fastening, such as screwing, gluing or fastening with double-sided adhesive tape.

In the preferred embodiment, retaining block 28 is attached to either vertical side of the visual display terminal, but alternatively, retaining block 28 may be secured to the top horizontal surface of the terminal. Retaining block 28 also defines holes 34 for slidably receiving support arms 30 therein. Support arms 30 are attached to mounting means 16 by means of plate 32 secured to mounting means 16. Plate 32 may be fastened to mounting means 16 using screws, glue or adhesive tape as before, and plate 32 may be secured to either the top member 21 or the side member 20 of mounting means 16. Alternatively, support arms 30 may be affixed directly to mounting means 16 using any conventional fastening means as described earlier. Support arms 30 are then inserted into holes 34 of retaining block 28 and mounting means 16 is then extensibly positioned proximate the visual display terminal a predetermined distance based upon such factors as operator's eyesight, amount of eye strain and operator's comfort.

Figure 2B:
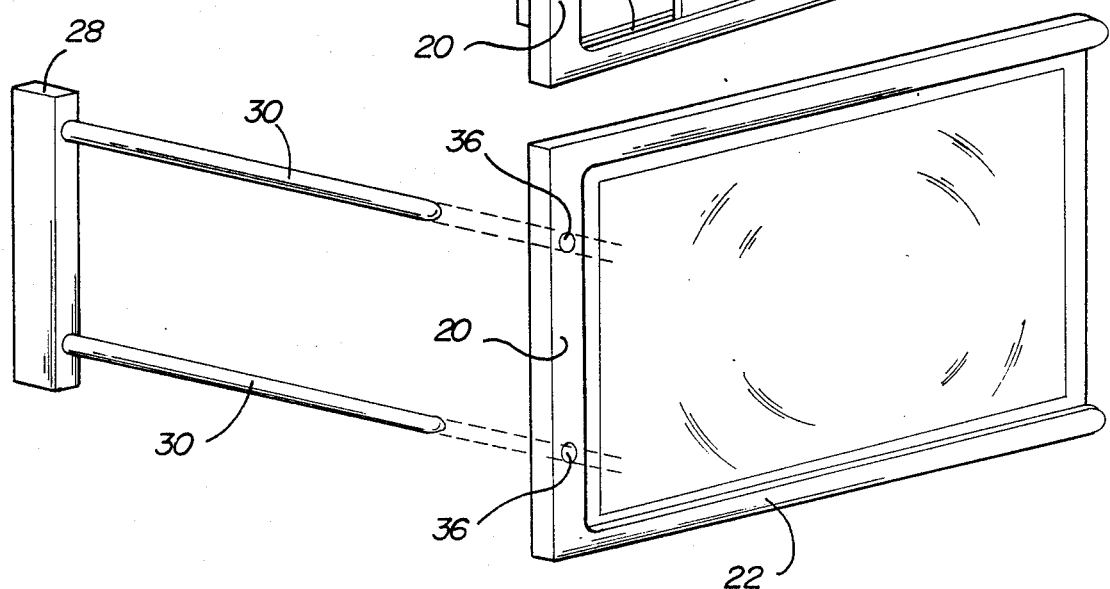
FIG. 2B is a perspective view of another embodiment of the holder of FIG. 1.

FIG. 2B shows an alternative embodiment of the mounting means 16 of FIG. 2A. In FIG. 2B, mounting means 16 similarly comprises three perpendicularly disposed frame members 20, 21, 22. In this embodiment, at least one of frame members, (as for example, the member herein shown as 20), includes two holes 36. Holes 36 slidably receive support arms 30 which are secured to retaining block 28. Mounting means 16 may then be extensibly positioned proximate the visual display terminal by sliding mounting means 16 along support arms 30.

Figure 3:
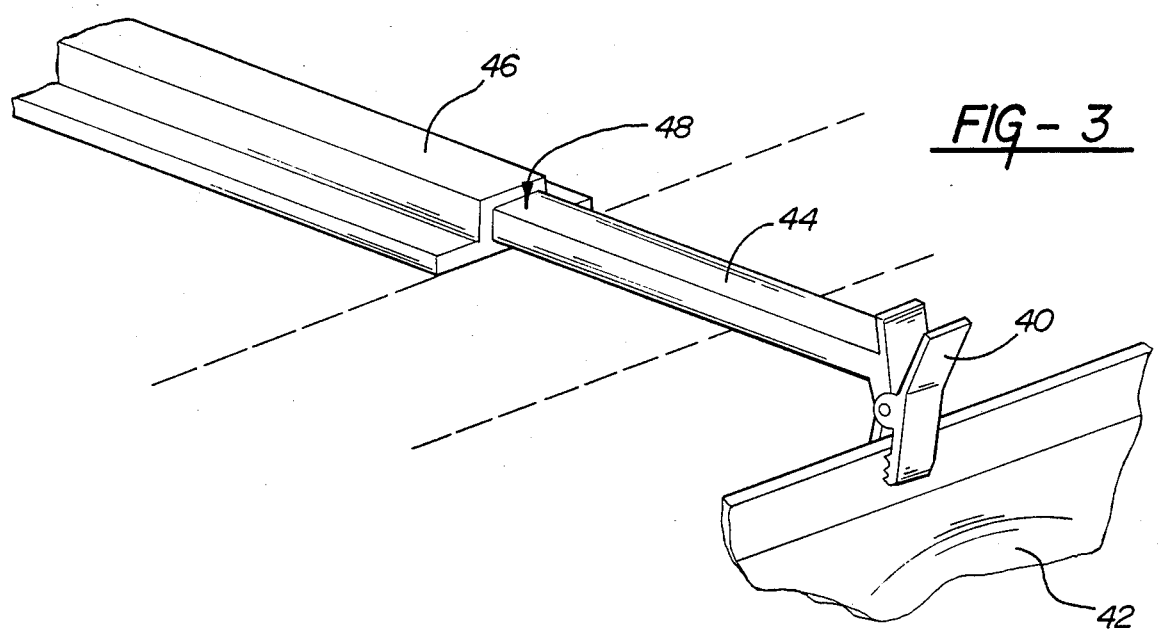
FIG. 3 is an exploded perspective view of an alternative embodiment of a holder for a flat sheet magnifier structured in accord with the principles of the present invention.

Referring now to FIG. 3, there is shown an alternative embodiment for a holder of a flat sheet magnifier. In this embodiment, the mounting means comprises a spring-biased clamping device 40 for securely holding magnifier 42. The clamping device 40 is secured to an end of a support arm 44 which, in combination with retaining block 46, provide means for supporting and extensibly positioning the mounting means. The retaining block 46 is affixed to the visual display terminal in the same manner as described above and comprises an opening or channel 48 for slidably receiving support arm 44 therein. Support arm 44 is extensibly positioned through opening 48 so as to position magnifier 42 proximate the visual display terminal.

Figure 4:
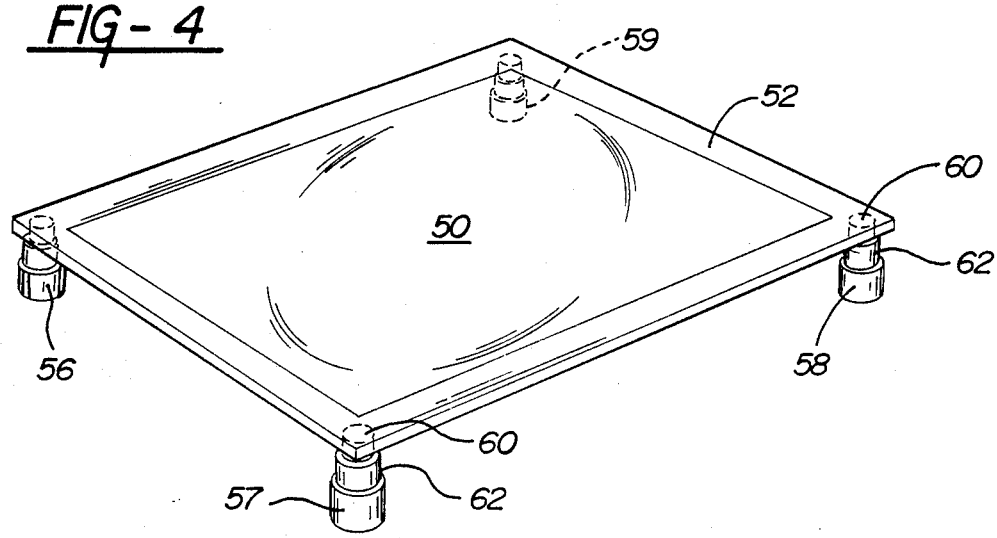
FIG. 4 is a perspective view of an alternative embodiment of a holder for a flat sheet magnifier structured in accord with the principles of the present invention.

FIG. 4 is a perspective view of yet another embodiment of the present invention wherein flat sheet magnifier 50 is contained and supported in mounting means 52 secured to support means comprising at least two, and preferably four, telescoping legs 56, 57, 58, 59. The mounting means may include at least three perpendicularly disposed members for receiving magnifier 50 therein generally similar to that shown in FIGS. 1, 2A and 2B. Alternatively, as shown in FIG. 4, mounting means 52 is fabricated as a unitary piece with the magnifier secured thereto. Legs 56, 57, 58, 59 may be affixed to mounting means with any conventional fastening means, such as screws, glue or adhesive tape.

Each leg 56, 57, 58, 59 includes at least two axially aligned telescoping segments 60, 62 which fit into one another to adjustably position magnifier 50 proximate a display terminal. Rubber seals or other friction bearing means are associated with the telescoping segments so as to support and retain mounting means 52 in an upright position after telescoping the legs from a first position to a second position. In this manner, flat sheet magnifier 50 may be placed over the visual display terminal of a lap top computer and extensibly positioned to various heights for the best visual results.

Figure 5:
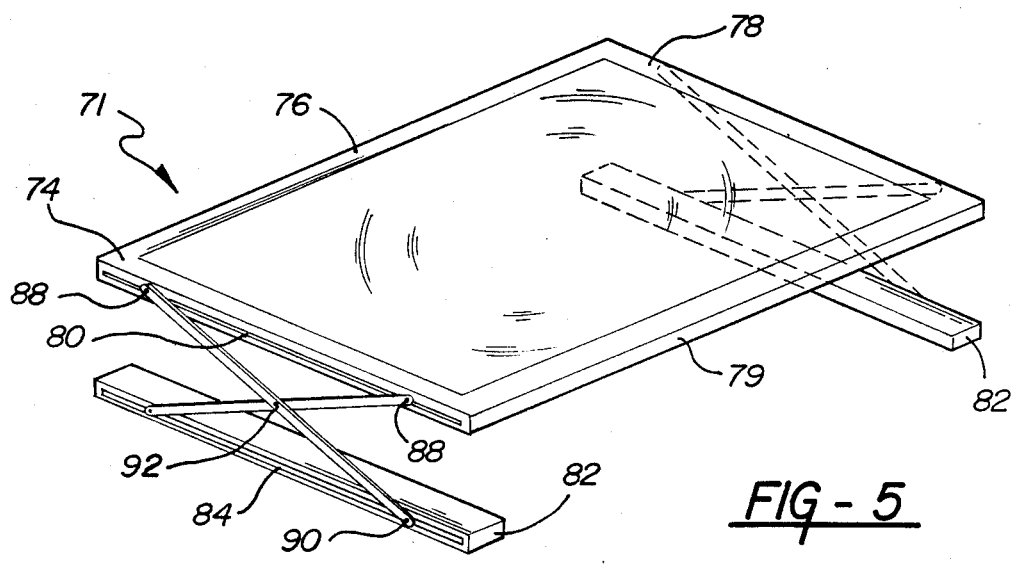
FIG. 5 is a perspective view of an alternative embodiment of a holder for a flat sheet magnifier structured in accord with the principles of the present invention.

Referring now to FIG. 5, there is shown a perspective view of yet another alternative embodiment of the present invention. In the embodiment of FIG. 5, flat sheet magnifier 70 is contained and secured within perpendicularly disposed frame members 74, 76, 78 and 79 of mounting means 71. Each frame member has an interior side configured to receive magnifier 70 therein, and an exterior side. Diametrically opposing frame members, such as 74,78 each define an exterior channel 80 in their respective exterior sides.

The holder as shown in FIG. 5 further comprises means for supporting and extensibly positioning magnifier 70 in a predetermined, spaced-apart relationship with a visual display terminal. The means includes two base members 82 parallel to frame members 74,78 and defining a second exterior channel 84. The means further includes two legs 86,87 for each base member, each leg having two ends 88,90 and a centerpoint 92 therebetween. Legs 86,87 pivotally intersect at their centerpoints 92 while ends 88,90 are secured in channels 80 and 84 respectively. Ends 88,90 contain pins or other like projections which project into channels 80,84 for displacement along said channels. The channels 80,84 include a friction bearing surface, such as a rubber lining, so that ends 88,90 remain in a fixed first position until moved to a second position under force. Flat sheet magnifier 70 is extensibly positioned by applying an either upward or downward force to frame members 74, 76, 78, 79 of the mounting means while base members 82 remain stationary. In this manner, ends 88,90 of legs 86,87 slidably displace in channels 80 and 84 to extensibly position the flat sheet magnifier in relation to a visual display terminal of a lap top computer for example.

In light of the foregoing, it should be apparent that many variations are possible within the scope of the present invention. Accordingly, the foregoing drawings, discussion and description are merely meant to be illustrative of particular embodiments of the invention and not limitations upon the practice thereof. It is the following claims and according all equivalents which define the scope of the invention.

What is claimed is:

1. A holder for adjustable positioning a flat sheet magnifier proximate a video display terminal comprising:
   mounting means for retaining said magnifier, said mounting means including a spring biased clamping device for securely holding said magnifier thereto; and
   means for supporting and extensibly positioning said mounting means in a predetermined, spaced-apart relationship with said terminal, said means including at least one support arm having said clamping device disposed at one end thereof, and a flat, rectangular retaining block securedly affixed to said terminal.

2. A holder as in claim 1, fabricated from a material selected from the group consisting essentially of: synthetic polymeric materials, metals, wood and combinations thereof.

3. A holder as defined in claim 1, wherein said flat, retaining block defines at least one hole for slidably receiving the other end of said at least one support arm therein for extensibly positioning said magnifier linearly along an axis coextensive with said arm.

4. A holder as defined in claim 3, wherein said hole is defined by a downwardly depending U-shaped channel formed on an upper surface of said flat retaining block and positioned on either side f a centerline thereof, said centerline being parallel to said axis.

* * * * *